United States Patent [19]

Melson

[11] 4,057,119
[45] Nov. 8, 1977

[54] POWERED HAND TRUCK FOR CLIMBING STEPS

[76] Inventor: James L. Melson, 11365 Orcas Ave., Lake View Terrace, Calif. 91342

[21] Appl. No.: 650,279

[22] Filed: Jan. 19, 1976

[51] Int. Cl.² .............................................. B62B 5/02
[52] U.S. Cl. .................................... 180/8 A; 280/5.3
[58] Field of Search ...................... 280/5.3, 5.22, 5.32; 180/8 A, 8 R; 92/30

[56] References Cited

U.S. PATENT DOCUMENTS

| 2,193,283 | 3/1940 | Haberson | 280/5.22 |
| 3,053,546 | 9/1962 | Muirhead | 280/5.3 |
| 3,417,831 | 12/1968 | Lake | 280/5.3 X |
| 3,494,440 | 2/1970 | Hanson | 280/5.3 |
| 3,550,709 | 12/1970 | Hottel | 280/5.3 X |
| 3,554,309 | 1/1971 | Abercrombie | 180/8 A |

FOREIGN PATENT DOCUMENTS

| 530,834 | 12/1921 | France | 92/30 |
| 185,067 | 8/1922 | United Kingdom | 280/5.32 |

Primary Examiner—Joseph F. Peters, Jr.
Assistant Examiner—John A. Pekar
Attorney, Agent, or Firm—Kleinberg, Morganstern, Scholnick & Mann

[57] ABSTRACT

A hand truck powered by pressurized gas for transporting a load up one or more steps, having a unique mechanical design permitting it to execute a smooth climbing motion up nosed or unnosed steps, and further having a power control system implementing several novel safety and convenience features.

28 Claims, 17 Drawing Figures

POWERED HAND TRUCK FOR CLIMBING STEPS

BACKGROUND OF THE INVENTION

1. Field of the Invention

The present invention is in the field of hand trucks and in particular there is disclosed a power assisted hand truck for climbing steps which operates according to a new principle.

2. The Prior Art

U.S. Pat. No. 3,053,546 to Muirhead shows a hand truck equipped with a pneumatic jack for use in climbing stairs. The jack is initially vertical, and when activated it raises the hand truck vertically until a required height is reached. The extension is manually triggered and when the trigger is released the ram portion of the jack begins to retract. The ram is either extending or retracting at any particular time and is stationary only when fully extended or retracted. When the wheels of the hand truck are off the step, the entire load is balanced on the foot of the ram. When the wheels of the hand truck have been elevated sufficiently, they may be pulled by the operator onto the next step, the ram and its cylinder pivoting with respect to the frame of the hand truck. Thereafter, the ram is retracted and the cylinder is restored to its initial position by a spring.

In U.S. Pat. No. 3,417,831, Lake describes a hand truck having a pneumatically powered ram having a pneumatic cylinder which is pivotally attached to the frame of the hand truck and which swings with respect to it in a plane perpendicular to the axis of the wheels. The Lake hand truck has a single common axle extending the width of the truck, to which both wheels are mounted. The presence of this axle requires that the cylinder be mounted between the axle and the load, and this in turn limits the extent to which the cylinder can pivot.

The pneumatic valves in Lake's hand truck are electrically controlled and a wet battery is carried on the hand truck to operate them. Because of the presence of the wet battery, the hand truck cannot be laid down and, in addition, separate maintenance of a second power system in addition to the pneumatic power system is required. Also, the electrical switching represents an explosion hazard in certain environments.

In one embodiment, Lake shows a hand truck equipped with endless glide belts which bear against the edge of the step when the wheels are elevated. However, as seen from the side, the profile of the glide belt does not merge tangentially with the profile of the wheel, thereby causing a discontinuous motion as the load is transferred from the glide belt to the wheel.

After the wheels of the Lake hand truck have cleared the next step, the ram is retracted. There is no provision in the Lake hand truck to prevent the foot of the ram from engaging the nosing of the step during retraction, thereby damaging it. Likewise, there is no provision to prevent the ram from striking the edge of the step as it rotates about its foot as the truck is tilted and lowered onto the next step. This can result in damage to the ram as well as the step.

In Lake's hand truck, the pneumatic cylinder is pivotable with respect to the frame of the hand truck in a plane perpendicular to the axis of the wheels. As the wheels clear the next step, the cylinder must pivot through an angle with respect to the frame. When this angle exceeds a predetermined limit, an electrical limit switch is actuated, which causes the ram to be automatically retracted. This automatic retracting feature can be actuated at any point in the lifting phase if the operator inadvertently permits the top of the frame of the hand cart to move too far forward. This can be dangerous if it occurs before the wheels have gained the next step, because the sudden change in direction, being unexpected, throws the operator off balance. In addition, in the Lake hand truck, as before mentioned, the total excursion of the cylinder during its pivoting is limited to a very small value because of the presence of the common axle of the hand truck, thus further contributing to critical operation of the hand truck.

SUMMARY OF THE INVENTION

In the present invention the operator adjusts the angle of the frame of the hand truck to balance the center of gravity over the axle, so that only moderate stabilizing forces need be applied to the hand grips to maintain the load in this balanced condition. This attitude of the hand truck is maintained at all phases of the stair climbing motion and no abrupt extended or unexpected motions of the hand truck occur, which would cause an operator to lose the balanced attitude of the hand truck by under or over compensation for such movement.

The hand truck in the balanced attitude is brought up against the edge of the first step in the usual manner. Portions of the hand truck herein referred to as "runners" contact the edge of the first step, while the weight of the load rests on the wheels.

In a preferred embodiment the runners have glide belts established on them and these glide belts are considered to be part of the runner. In those embodiments where a glide belt is used, it will be understood that it is the glide belt portion of the runner whose lateral projection is tangent to the wheels of the hand truck. The operator, who has stationed himself on the steps above the hand truck, next operates a control which causes a pneumatic ram to extend in a generally downward direction and pressing against the support surface at a point between the wheels. As the ram extends under the operator's control, the hand truck is forced in the direction of the runners diagonally upward across the edge of the step.

In a preferred embodiment the guide belts are positioned so that their lateral projection is tangent to the wheels on their underside. This assures that a smooth transition will occur as the load is shifted from the glide belts to the wheels upon attaining the edge of the next step as the extension motion continues.

As the extension motion continues, the hand truck first moves diagonally upward along the edge of the step in a straight line and then rounds over in a arc whose radius is determined by the radius of the wheel and then is forced towards the riser of the second step. Thus, the climbing motion exhibited by the hand truck of the present invention consists of a diagonally upward motion blending smoothly into a horizontal motion without interfering with the balance attitude of the hand truck.

Because the hand truck of the present invention eases itself onto each step smoothly and automatically, it is not necessary for the operator to concern himself with estimating the proper amount of extension of the ram. Once the next step has been attained, and some rearward motion produced along its tread, further extension of the ram is prevented and the ram is held stationary at its attained extension by an automatic neutralizing means, which in a preferred embodiment is activated when the ram has rotated through a predetermined angle with respect to the frame of the hand truck. The ram will then be held indefinitely at its attained extension until such time as the operator of the hand truck chooses to manually order a subsequent retraction.

In a preferred embodiment the selective control of extension, neutralization (holding), and retraction of the ram is accomplished through operation of a pneumatic control valve by entirely mechanical linkages without any use or requirement for electrical switching, thus eliminating any requirement for the extra parts, limitations, and complexity of a separate battery and associated electrical switching system.

In a preferred embodiment, a guard is provided which extends with the ram into a position below the wheel and located between the ram and the plane defined by the runners. This guard performs several new and useful functions. It limits the extent to which the hand truck can roll onto the newly-acquired step. Too large a rolling-on motion, particularly if the load distribution is such that the motion is abrupt, will force the operator to compensate by moving backwards, thereby disrupting his balance. This guard also prevents the hand truck from moving so far out onto the newly acquired step that the polished surface of the ram would come in contact with the edge of that step. The guard further functions to prevent the end of the ram from damaging the edge of the step during the retraction of the ram.

In all cases, the hand truck rolls onto the newly attained step a small safe distance. Thereafter, the ram and guard must be retracted before the operator can roll the hand truck towards himself across the tread of the newly attained step and into position with its guide belts in contact with the edge of the next step.

Because the ram necessarily pivots with respect to the frame of the hand truck, it is necessary to provide means for returning the ram to its original angular orientation in preparation for the next step. In a preferred embodiment this is accomplished through the use of an ingenious mechanical arrangement between the cylinder and an element affixed to the hand truck frame which is directly pushed by the retracting ram to swing the ram and its cylinder back to the initial position.

In a preferred embodiment, the wheels are equipped with ratchets, which permit them to roll onto a newly acquired step but which prevent the wheels from rolling off the edge of the step while the ram is being retracted as might otherwise be the case if the tread of the newly-acquired step sloped downward. The ratchets are engaged automatically upon activation of the extension control and can be released only by affirmative operator action. Means are included to achieve simultaneous engagement of the ratchets on the right and left wheels. The ratchets can also be engaged or disengaged at will by the operator for use in rolling up steep inclines, ramps, etc. or over obstacles such as thresholds of doors by advancing each wheel a small amount at a time.

In the preferred embodiment, endless glide belts are provided, which slide along the runners to minimize damage to the edge of the step and to provide a low coefficient of friction between the moving parts. As seen from the side of the hand truck the profile of the glide belts merge tangentially with the profile of the wheels, thereby eliminating any discontinuity of motion at the critical moment when the load is transferred from the glide belts to the wheels.

Unlike hand trucks of the prior art, steps having a nosing, i.e., a small extension of the tread overhanging the riser, present no difficulty whatsoever for the operation of the hand truck of the present invention.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DESCRIPTION OF THE PREFERRED EMBODIMENT

FIGS. 1-10 are a sequence of simplified diagrams illustrating the interaction of the parts of the present invention as it performs one cycle of its stepping operation. For simplicity the invention will be referred to as a hand truck, although, as will be seen later, other embodiments are also possible.

Figure 1:
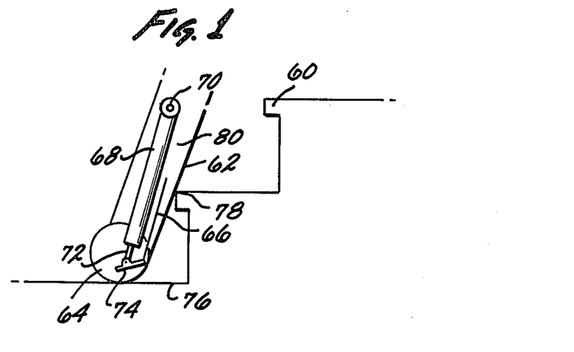
FIGS. 1 through 10 are a sequence of simplified diagrams illustrating the operation of a preferred embodiment of the present invention when climbing a step.

FIG. 1 shows a hand truck in its initial position, having been pulled up towards the first step so that the edge 78 of the first step is in contact with runner 62 of a frame 80 of the hand truck. At this point the weight of the hand truck and load is borne entirely by the wheels 64 in contact with the floor or tread 76. The axis of wheel 64 extends in a horizontal direction. Runners 62 may, in a simple embodiment, comprise the edge of the frame or structural member 80 to which the wheel 64 is rotatably attached. In a preferred embodiment, the runner 62 further includes a glide belt, as described above. A cylinder 68 is pivotally attached to frame 80 at pivot 70, to permit it to pivot through a relatively small angle with respect to runner 62 as shown more clearly in FIGS. 6-8.

Figure 6:
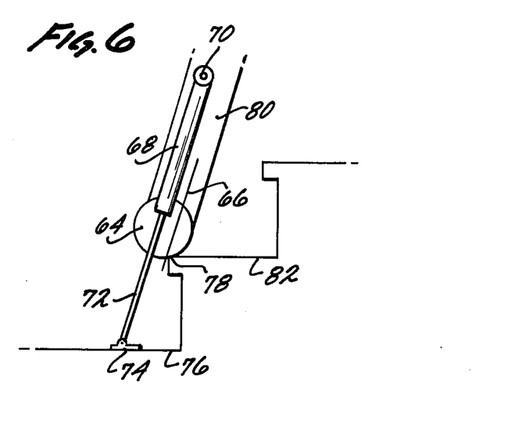

Cylinder 68 can be pressurized at one end to drive ram 72 from a retracted position as shown in FIG. 1 to an extended position as shown in FIG. 6, can be neutralized to hold in any partial or wholly extended position and can be pressurized at its other end to retract ram 72 as shown in FIGS. 6–9. In a preferred embodiment, ram 72 may be equipped with a foot 74, pivotable with respect to ram 72, for distributing the pressure of the ram over a larger area on surface 76. In a preferred embodiment, that portion of foot 74 which contacts surface 76 is supplied with a layer of material having a high coefficient of friction on surface 76.

Although the steps shown in FIGS. 1–10 are of a type having a nosing 60, it is understood that the hand truck of the present invention can climb with equal ease steps not having a nosing.

Figure 2:
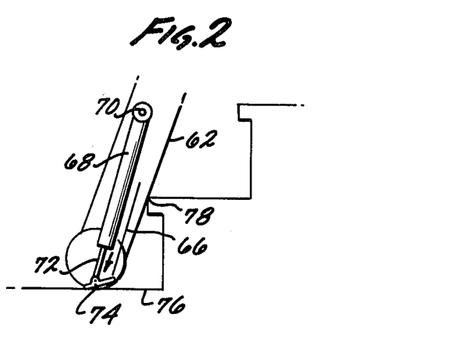

With the runner 62 contacting the edge 78 of the first step, in response to a manual triggering operation of a pressure control valve (not shown) cylinder 68 is pressurized at its upper end and vented at its lower end, driving ram 72 towards surface 76 as shown in FIG. 2. Guard 66 rests on foot 74 of ram 72 when the ram is in its retracted position. Extension of ram 72 permits guard 66 to slide downward until it reaches its limit. The function of guard 66 will become clear below.

Figure 3:
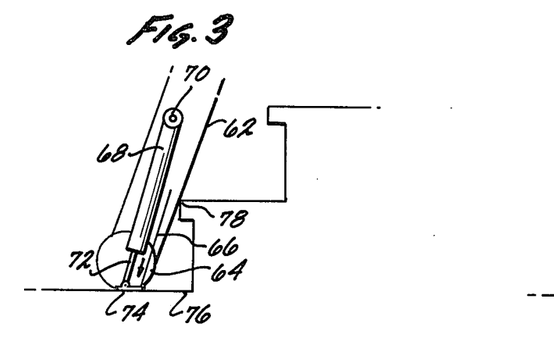
Figure 4:
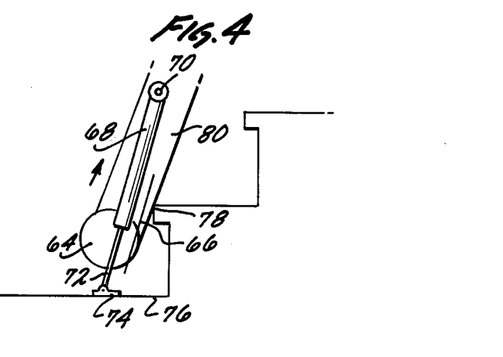

In FIG. 3, ram 72 has further been extended and foot 74 is now squarely planted on surface 76. Continued pressurization of the upper portion of cylinder 68 now forces frame 80 and those elements connected with it upward as shown in FIG. 4. This permits guard 66 to continue to extend to its lowermost position relative to frame 80 as shown in FIG. 4.

Figure 5:
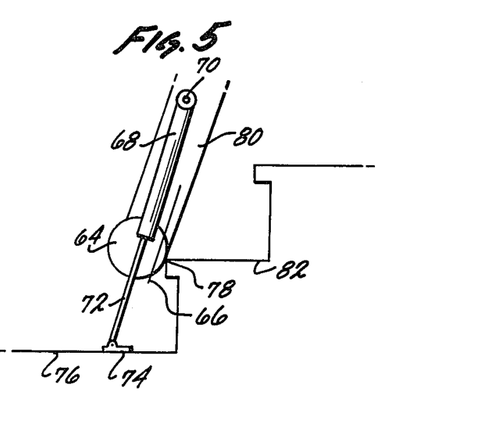

In FIG. 5, further pressurization has lifted frame 80 to the position shown. At this position, a transition takes place. Previously, runner 62 was in contact with edge 78 of the first step, but now wheel 64 makes contact with the edge 78. Because the lateral projection of runner 62 is tangent to wheel 64 on its lower side, as shown in FIG. 5, the transition is a smooth one.

As wheel 64 makes contact with the edge 78 of the first step and begins to roll thereon, cylinder 68 begins to pivot with respect to frame 80 as ram 72 continues to extend. This pivoting motion of cylinder 68 operates a control rod and related linkage (not shown) connected to valve 180 (not shown) gradually shutting off the flow of pressurizing gas to the upper portion of the cylinder 68 and closing the cylinder ports precisely at the point the cylinder reaches its pivoting limit in a preferred embodiment. The effect of this is to hold the ram at whatever extended position it may have attained, thereby inactivating the climbing sequence until it is restored by positive action on the part of the operator.

As the pressurizing gas is being shut off, the axis of wheel 64 passes over the edge 78 of the first step, and the weight of the hand cart and load is now borne by wheel 64. The hand truck is thereafter rolled rearward along tread 82 until the guard 66 bears against edge 78 as shown in FIG. 6. This prevents an undesirable large roll-on motion, which because of its extent and abruptness would tend to throw the operator off balance.

In a preferred embodiment, wheel 64 is supplied with a ratchet (not shown) which can be engaged to permit only rearward motion, thereby avoiding any risk that wheel 64 would roll forward off tread 82, even if tread 82 were to have a slight downward slope, as is not uncommon.

Figure 7:
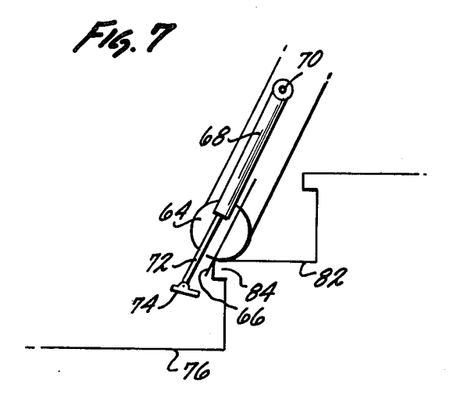

With the hand truck in the same position as that shown in FIG. 6, in response to a positive manual triggering, the lower portion of cylinder 68 is pressurized and its upper portion is vented, causing ram 72 to retract upward into cylinder 68 as shown in FIG. 7.

FIGS. 6 and 7 together illustrate some of the functional advantages of guard 66. In FIG. 6 it is seen that guard 66 limited the extent to which wheel 64 could initially roll rearward onto tread 82. This results in a controlled motion of the hand cart, thereby helping the operator to maintain his balance. Further, guard 66 prevents the polished cylinder of ram 72 from striking the edge 78 of the step. This is important both to prevent damage to the step and to insure that polished ram 72 always makes a good pressure seal and to prevent damage upon retraction of ram 72. In FIG. 7 it is seen that guard 66 provides clearance so that foot 74 cannot engage nosing 84 of the first step. This eliminates one of the more severe problems encountered with prior art devices.

Figure 8:
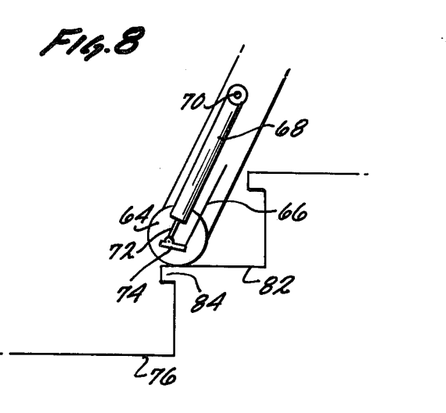
Figure 9:
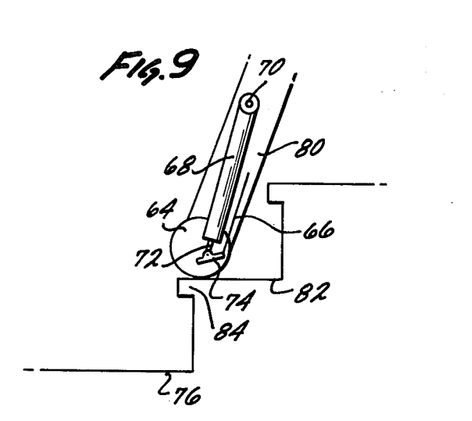

Further retraction of ram 72 as indicated in FIG. 8 has the effect of retracting guard 66 in the same general direction as ram 72. Still further retraction of ram 72, as shown in FIG. 9 mechanically operates a linkage mechanism which in a preferred embodiment (shown in FIG. 13) causes cylinder 68 to pivot relative to frame 80 about pivot 70 back to its original position, as shown in FIG. 9.

Figure 10:
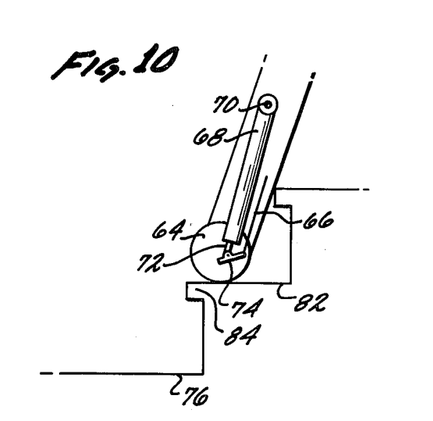

Thereafter, the hand truck will roll rearward along tread 82 until runner 62 contacts edge 86 of the second step, as shown in FIG. 10. This is essentially the same position shown in FIG. 1, and as long as the ratchet on wheel 64 remains engaged, preventing forward motion, the hand truck can stand alone in the position shown in FIG. 10, permitting the operator to take a rest if he should so desire.

Thus, in FIGS. 1–10 one complete stepping cycle of the hand truck has been shown. The theory of operation having now been clarified, the implementation of a preferred embodiment will next be examined in detail.

Figure 11:
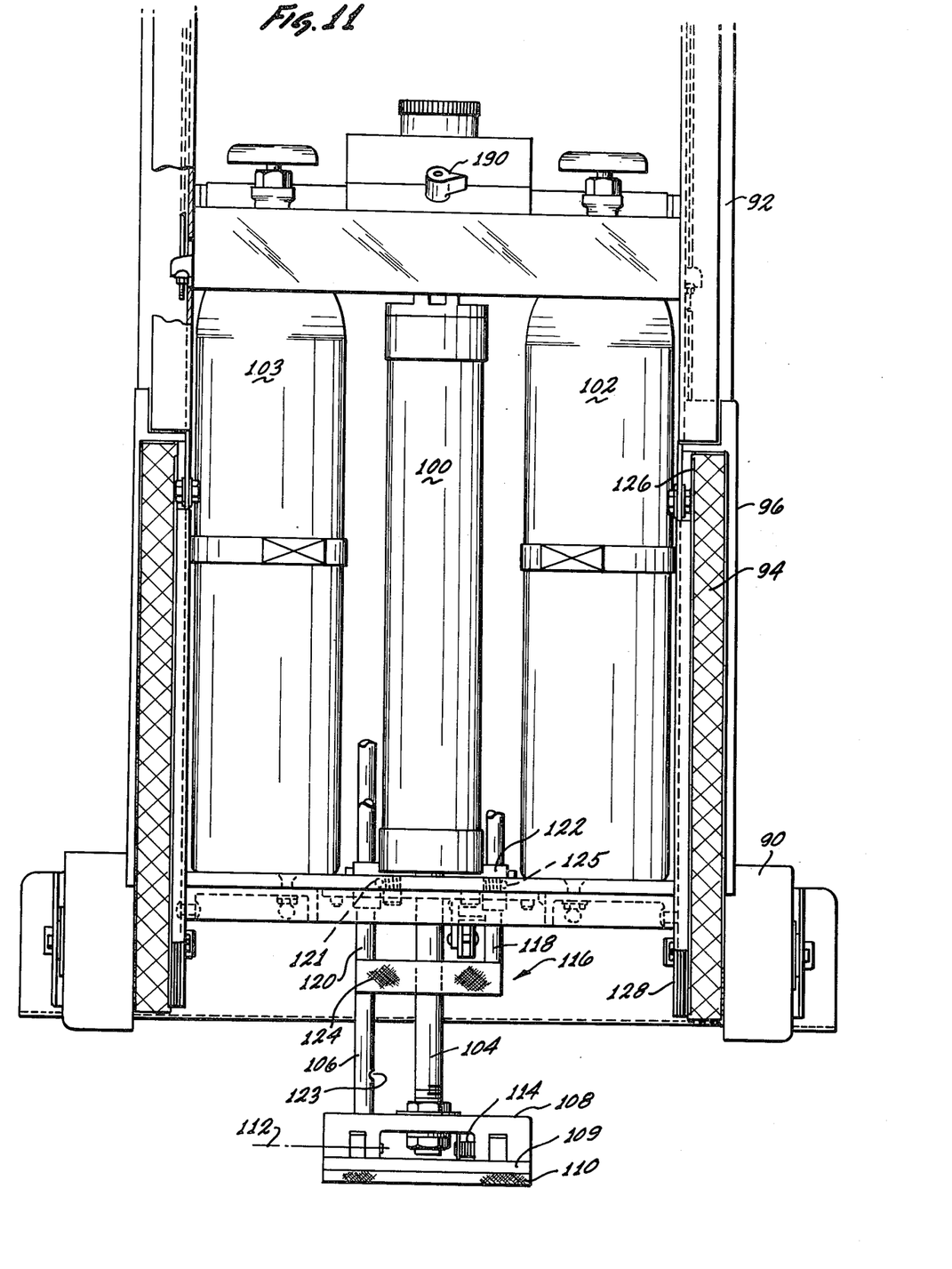
FIG. 11 is a rear view of a preferred embodiment of a hand truck constructed according to the present invention.

FIG. 11 is a rear view of a preferred embodiment of a hand truck according to the present invention, looking at the side of it which normally faces up the stairs towards the operator. The hand truck comprises a generally rectangular frame 92 to which wheels, of which 90 is typical, are rotatably attached. The wheels have a common axis of rotation, but there is no common axle extending the width of the hand truck as in Lake, supra. The absence of a laterally-extending axle permits the cylinder 100 to be guided farther toward the rear of the hand truck than is possible in Lake, and permits the cylinder to pivot through a larger angle and excursion, thereby assuring that the wheels will be able to swing well onto the next step and also allowing the cylinder to actuate positive and non-critical operation of a mechanical arrangement for neutralizing or holding the ram in response to such excursion.

As indicated in the preferred embodiment shown in FIG. 11 an endless glide belt 94 passes around pulleys 126 and 128 and over runner 96.

Cylinder 100 may be selectively pressurized at either end by a gas contained under high pressure in cylinder 102, thereby extending or retracting ram 104 and can have its ports blocked to hold the ram in any extended position.

Ram 104 is equipped with a foot 108 having a lower portion 109 pivotable about axis 112 and biased about that axis by spring 114, so as to assume the attitude shown above in FIG. 1. This attitude has two advantages.

First, it prevents the lower portion 109 from being damaged by dragging in the event ram 104 becomes extended while the hand truck is being moved in the usual direction.

Secondly, experience has shown that when the ram 104 is extended and lower portion 109 contacts the floor or tread of a step, a locking action takes place whereby the lower end of ram 104 is urged slightly rearward towards a riser of the step, and this has been found to reduce slippage of the lower portion 109 against the floor or tread. Slippage is further reduced by a provision of a layer 110 of rubber or similar non-skidding material on the lower surface of portion 109. Rod 106 prevents ram 104 and foot 108 from rotating about the axis of cylinder 100.

FIG. 11 also shows guard 116 lower consists of a blade-like member 124 attached to rods 118 and 120. These rods pass slidably through blocks 122 to permit blade 124 to extend and retract. Guard 116 is extended by the action of gravity, when not held in its retracted position by foot 108. In FIG. 11 ram 104 is shown in a partially extended position, but guard 124 is shown at or near its retracted position. When ram 104 is retracted, it pushes guard 116 toward cylinder 100 thereby returning guard 116 to its retracted position, as can better be seen in FIG. 13.

FIG. 11 also shows the location of a detent used for holding the ram 104 in its extreme retracted position. The detent consists of a spring-loaded ball 121 carried in a block at the end of cylinder 100, which engages a depression 123 in rod 106 to hold the ram assembly when it has been fully retracted. A similar spring-loaded ball detent 125 is used to hold the ram assembly in the extreme angular positions of its pivotal motion.

Figure 12:
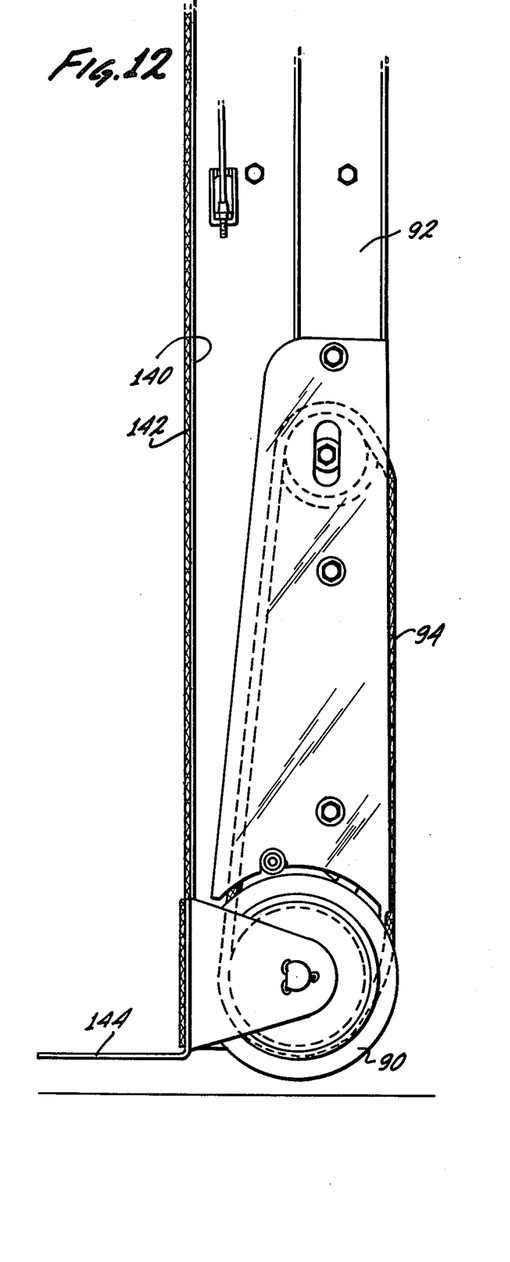
FIG. 12 is a side view of a preferred embodiment of a hand truck constructed according to the present invention.

FIG. 12 is a side view of a hand truck according to the present invention. FIG. 12 shows more clearly the tangential relationship between the guide belt 94 and the wheel 90. The front side of the frame 92 has a load-bearing surface 140 which, in a preferred embodiment, may be covered with a layer 142 of felt or similar resilient material to prevent marring of the load. Flange 144 is provided at the lower front edge of the hand truck to support the load.

Figure 13:
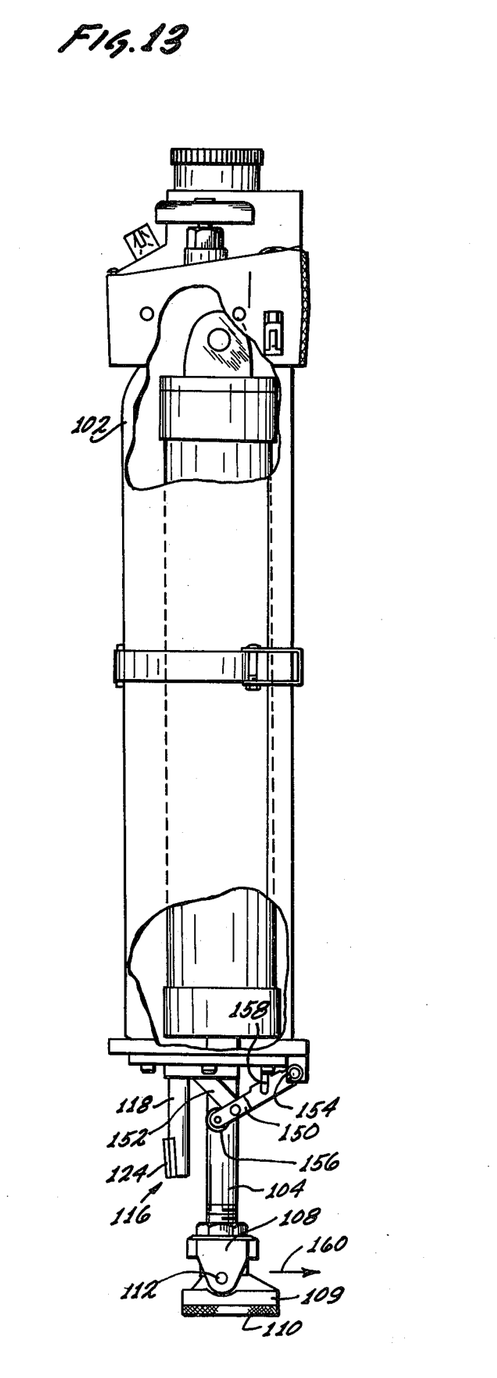
FIG. 13 is a side view of a pneumatic cylinder and ram used with a preferred embodiment of the present invention.

FIG. 13 shows a side view of the power unit used with a preferred embodiment of the present invention. The ram in the view of FIG. 13 is shown partially extended. Parts 150 and 152 form a linkage for returning cylinder 100 and ram 104 to their initial location at the completion of the retraction phase. Part 150 is pivoted with respect to the frame of the hand cart at point 154 while part 152 is pivoted to cylinder 100. Part 150 is also provided with a follower wheel 156 to permit it to ride on part 108 with a minimum of wear. Upon full retraction of ram 104, part 150 and part 152 are forced to a more horizontal attitude which results in part 152 pushing cylinder 100 toward the back side of the hand truck to its initial position.

FIG. 13 also shows the operation of the automatic shutoff link of the power control system. Extension of ram 104 beyond the position shown in FIG. 13 has no effect on the toggle, however, the toggle is quite sensitive to the front and back tilting motion of cylinder 100. As described above, this tilting motion occurs toward the end of the extension phase as wheels 90 rise over the edge of the step. As this occurs, foot 109 moves in the direction shown by arrow 160 relative to frame 92, as illustrated in FIGS. 5 and 6 above. This motion of cylinder 100 increases the angle between parts 150 and 152, resulting in a downward, counter-clockwise motion of part 150 about pivot 154. This in turn, imparts a downward shift to part 158 which is a downwardly extending rod bent at its lower end to a horizontal direction and thereafter passing through a hole in part 150. As illustrated in FIG. 13, control rod 158 extends vertically downward and then turns into the plane of the drawing. The downward shift imparted to control rod 158 by the pivotal motion of cylinder 100 in the front and back direction is used, as will be seen below, to shut off the flow of compressed gas to the upper portion of cylinder 100, and thus to prevent further extension of ram 104.

Upon retraction of ram 104, and upon return of cylinder 100 to its initial position, control rod 158 is given an upward shift. The design of the actuating mechanism for the control valve is such that this upward shift of control rod 158 can produce no effect, and thus does not restore the flow of gas to extend the ram.

Figure 14:
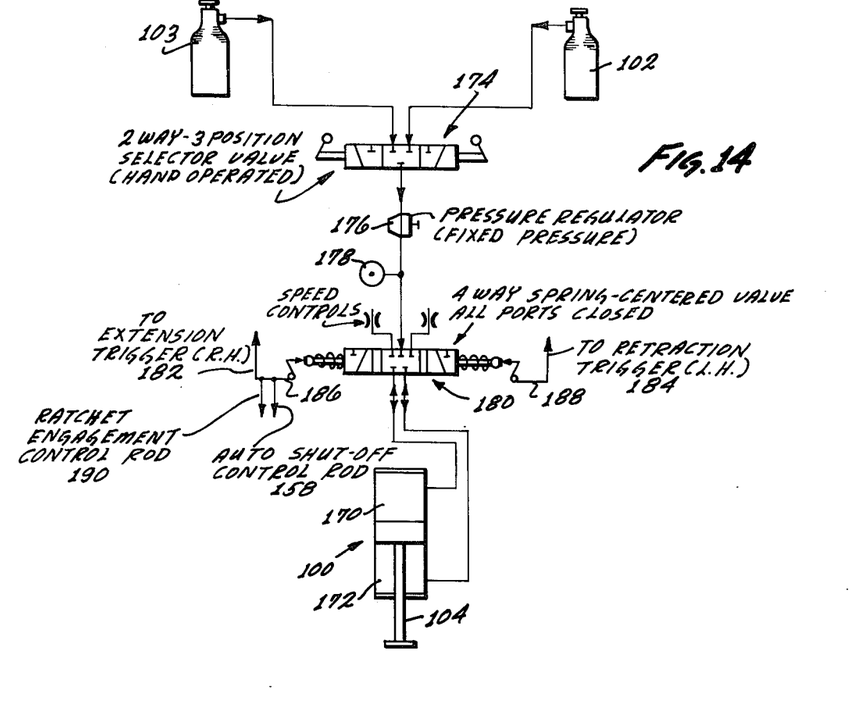
FIG. 14 is a schematic diagram of the power control system used with a preferred embodiment of the present invention.
Figure 15:
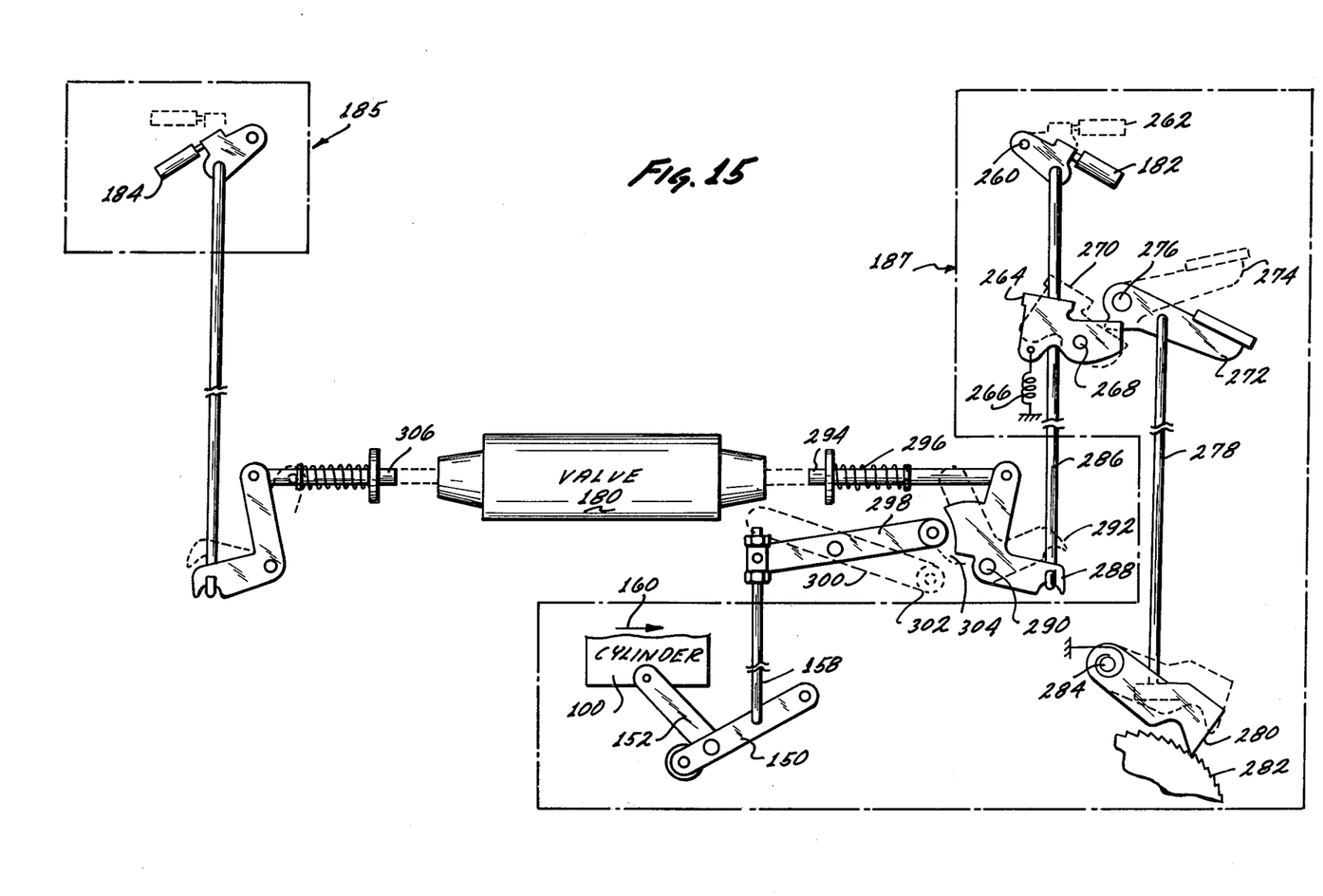
FIG. 15 is a diagram showing the interaction of the mechanical elements of the power control system in a preferred embodiment.

FIG. 14 is a schematic diagram showing functional relationship of the pneumatic power control system used in a preferred embodiment of the present invention. A more detailed structural diagram is shown in FIG. 15. Compressed gas, typically carbon dioxide, is supplied to the system selectively from either of two cylinders 102 or 103. The selection is made by the operator who manipulates selector knob 190 of FIG. 11 to activate the three position selector valve 174. Pressure regulator 176 reduces the pressure supplied to a more modest value which can be monitored on gauge 178. The gas supplied is then fed to a four way spring centered valve 180. In its centered position, all of the ports of the valve are closed and gas cannot flow through it in either direction.

Depressing the extension trigger 182 which is mounted near the right hand grip of the hand truck operates through a linkage 186 to translate the spool of valve 180 to the right, thereby connecting the gas supply to the upper portion 170 of cylinder 100 and simultaneously permitting the gas in the lower portion 172 of cylinder 100 to discharge through a throttled port, which is part of valve 180. Gas is supplied to upper portion 170 only so long as extension trigger 182 is depressed, so that the operator can stop the extension of ram 104 at any level he chooses. That level will be maintained for extended periods if required until the operator takes further positive action.

The operator may then decide to retract ram 104, which is accomplished by depressing retraction trigger 184, which operates through a mechanical linkage 188 to shift the spool of valve 180 towards the left, thereby connecting the supply of pressurized gas to the lower portion 172 of cylinder 100 while permitting the gas trapped in the upper portion 170 of cylinder 100 to discharge through a throttled port which is part of valve 180. The operator may terminate the retraction motion at any time by releasing retraction trigger 184, which permits the centering springs to return valve 180 to its centered or neutral condition. Thus, the operator maintains positive manual control of both the extension and retraction motions. In one situation, however, there is an automatic release or neutralization of a manually ordered extension.

Considering the automatic neutralization in more detail as described above in connection with FIG. 13, control rod 158 is shifted downward when the wheel 90 of the hand cart rolls over the step to be attained. This downward shift of control rod 158 is applied through mechanical linkage 186 to operate valve 180 to shut off the supply of pressurized gas to the upper portion 170 of cylinder 100, thereby overriding extension trigger 182.

It should be noted that control rod 158 does not override retraction trigger 184, and therefore it is possible to retract ram 104 if, for some reason, automatic shut off has been initiated prematurely.

Another safety feature of the hand truck of the preferred embodiment of the present invention is provision for engagement of the wheel ratchets when the extension trigger 182 is pulled up. Pulling of trigger 182 operates through ratchet engagement control rod 190 to engage both wheel ratchets simultaneously. These ratchets can be disengaged only by a positive action on the part of the operator.

The functional relationships between mechanical elements of the power control system are shown in FIG. 15. For purposes of clarity of presentation the elements enclosed in dashed line enclosures 185 and 187 have been rotated 90° from their positions in the preferred embodiment to show them in profile. It will be understood that in the preferred embodiment of FIG. 15 the triggers 184, 182 and 272 and their associated elements as shown will extend in a front and back direction to provide convenient accessability to the thumb and fingers of the operator holding the hand truck in a normal position. The mechanical system shown in FIG. 15 implements a number of novel safety and convenience features of the present invention. The interaction of the parts of the control system will be described throughout a complete stepping cycle.

Extension trigger 182 is initially in the position shown by solid lines, and the operator initiates extension of the ram by pulling upward on the trigger 182 until it has pivoted about pivot 260 to the position 262 indicated by dotted lines. This has two effects.

First, it trips ratchet lock 264 from its initial position shown by the solid lines and maintained in that initial position by spring 266, to a position rotated about pivot 268 and denoted by dotted lines 270. This, in turn, permits ratchet release lever 272 to move from its initial position shown by dotted lines 274 to the position shown by solid lines, pivoting about pivot 276. In so doing, rod 278 is released downward allowing downwardly spring loaded ratchet pawl 280 to engage the ratchet teeth 282, by pivoting about pivot 284. This is one of the safety features of the present invention. It assures that the ratchet will be engaged any time the extension trigger 182 is operated.

The second effect of operating extension trigger 182 is to shift the rod 286 in an upward direction, thereby pivoting crank 288 from its initial position shown in solid lines to a position pivoted about pivot 290 and shown by solid lines 292. This, in turn, pushes plunger 294, normally restrained by spring 296, into valve 180, permitting gas to flow to the upper portion of cylinder 100 (shown in FIG. 14). It must be remembered that initially the angle between toggle members 150 and 152 is relatively shallow, resulting in control rod 158 being initially in its upwardly shifted position, which, in turn, results in crank 298 being initially in the position shown by dotted lines 300. Thus, follower wheel 302 does not engage crank 288 at this time.

As the extension motion continues, with crank 288 in the position shown by dotted lines 292, a point is reached in which the wheel of the hand truck begins to roll over to the edge of the step, thereby causing cylinder 100 to pivot in the direction shown by arrow 160, thereby producing a downward movement of control rod 158 which, operating through crank 298 causes follower wheel 302 to engage the surface 304 of crank 288, pivoting it in a clockwise direction about pivot 290, thereby withdrawing plunger 294 from valve 180. This illustrates another of the features of the power control system of the present invention. Further extension of ram 104 is automatically prevented after the wheel of the hand truck has passed over the edge of the step and the existing extension is maintained until further positive action is taken by the operator.

Next, it is necessary to retract ram 104, which is done by pulling upward on retraction trigger 184, thereby extending plunger 306 into valve 180, causing valve 180 to pass pressurized gas to the lower portion 172 of cylinder 100.

Near the end of the retraction phase, the retraction of ram 104 activates the toggle comprised of members 150 and 152 compressing it and forcing cylinder 100 leftward to its initial position. This, in turn, restores crank 298 into the position shown by dotted lines 300, thereby enabling the next extension phase.

If the operator desires to release the wheel ratchet, this may be done by pulling upward on ratchet release lever 272 pivoting it about pivot 276 to the position shown by dotted lines 274, at which position it is latched by ratchet latch 264. Again, positive action on the part of the operator is required, and this is an important safety feature of the present invention.

Figure 16:
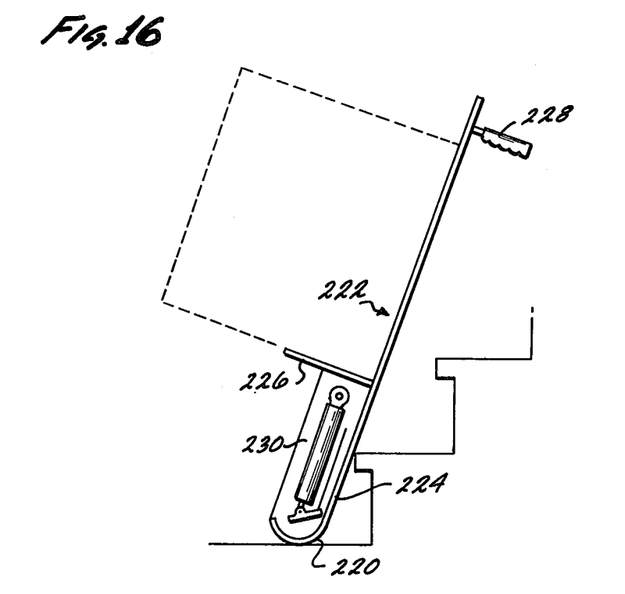
FIG. 16 is a side view of a stair-climbing sled constructed according to the present invention.

The power module of FIG. 13 is removably mountable in the hand truck frame and can be removed therefrom for use as the stair climbing power lift element for other related types of load carrying units. For example, one can visualize a hand truck as shown in FIG. 16 which does not have wheels but instead merely has an arcuate skid at the bottom. Both the wheeled and skid-equipped hand trucks can be considered to be variants of a basic generic sled structure.

FIG. 16 shows a simple sled for moving loads. The sled has a frame 222 shaped like a toboggan. The frame 222 includes a curved bottom portion 220 merging smoothly into a planar portion 224 which is the runner, a shelf 226 may be provided for supporting the load, and a hand grip 228 may also be provided for ease of handling. The power module 230 would be mounted in the lower portion of the sled as shown in FIG. 16.

The embodiment of the present invention shown in FIG. 16 illustrates that the wheel is not an essential element of the invention. The stair-climbing motion of the sled or skid-equipped lift truck of FIG. 16 is identical with that of the hand truck.

Figure 17:
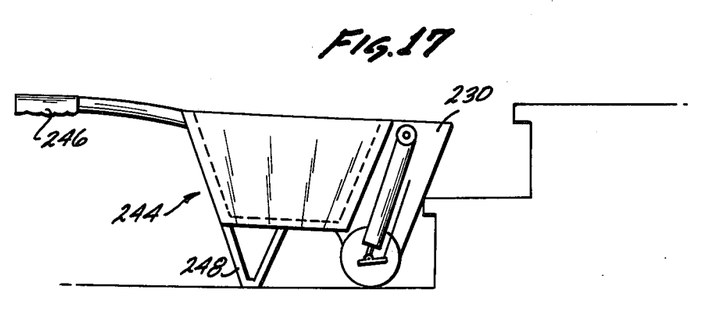
FIG. 17 is a side view of a stair-climbing wheel-barrow constructed according to the present invention.

FIG. 17 shows how power module 230 constructed according to the present invention, can be mounted to an otherwise conventional wheelbarrow 244 to enable it to climb a flight of stairs. The operator would stand near the hand grips 246, and would not be called upon to exert more forces than he normally would exert to stabilize the wheelbarrow. If it is desired for some reason to park the wheelbarrow half way up the flight of stairs, a portable box-like structure could be placed under the legs 248 to support them at a height which will keep the wheelbarrow level.

Thus, the present invention can be employed in many alternative embodiments, all of which having in common the basic stair-climbing cycle of operation illustrated in FIGS. 1-10.

The foregoing detailed description is illustrative of one embodiment of the invention, and it is to be understood that additional embodiments thereof will be obvious to those skilled in the art. The embodiments described herein together with those additional embodi-

What is claimed is:

1. A powered hand truck capable of climbing stair steps comprising:
   a frame extending in a longitudinal direction from a lower end to an upper end and extending laterally from a left side to a right side, having a front side for retaining a load and a back side, and having a pair of runners extending in the longitudinal direction along the lower portion of the back of said frame;
   a pair of support wheels attached for rotation about a common lateral axis to the lower end of said frame;
   powered means pivotally connected to said frame for limited rotational swinging movement about a lateral axis, said powered means having a powered ram and being selectively operable to extend said ram in a generally longitudinal direction below said wheels, and to maintain said ram held at an attained extension, and to retract said ram;
   manually actuable means for operating said powered means to extend said ram for elevating the hand truck to an upper stair step; and
   neutralizing means connected between said frame and said powered means and responsive during extension of said ram in climbing a stair step to predetermined pivotal rotation of said powered means toward said front side of said frame as the elevated hand truck begins to roll onto the stair step for automatically operating said powered means to terminate further extension of said ram and maintain the then-attained extension of said ram.

2. The powered hand truck of claim 1 wherein said support wheels have independent laterally extending axles laterally spaced apart and wherein said powered means during ascent of a step is pivoted toward the front side of the frame through the space between said axles solely in response to the load shift occasioned by the rolling of the hand track onto the step.

3. The powered hand truck of claim 1 wherein said powered means further comprises:
   a pneumatic cylinder having two inlet ports for applying pneumatic forces to said ram in both directions parallel to the axis of said cylinder, for selectively extending and retracting said ram and for maintaining it at an attained extension or retraction;
   a bi-directional pneumatic control valve, comprising two outlet ports, each connected to one of said inlet ports of said pneumatic cylinder, and an inlet port, said valve normally yieldably remaining in a neutral configuration wherein said inlet port is not connected to either of said outlet ports, and solely mechanically actuatable to configurations wherein said inlet port is selectively connected to one of the outlet ports, said ram maintaining an existing extension while said control valve is in its neutral configuration and until the valve is mechanically actuated to one of the other configurations by positive action of an operator; and
   a source of pneumatic pressure, connected to said inlet port of said pneumatic control valve.

4. The powered hand truck of claim 3 wherein said neutralizing means further comprises:
   mechanical linkage means connected to said frame and said powered means, responsive during extension of said ram to the predetermined pivotal rotation of said powered means about said lateral axis toward the front of said frame for blocking mechanical actuation of said pneumatic control valve to a configuration wherein the inlet port of said control valve is interconnected to a predetermined one of its output ports associated with extension of said ram.

5. The powered hand truck of claim 4 wherein said mechanical linkage is connected between said powered means and said frame and is extendible and contractible to provide a continuous fore and aft connection between the frame and the pivotally swingable powered means and changes its fore and aft length in solely mechanical response to upward pressure thereon, said linkage being upwardly contacted and pressed by said ram during its retracting motion to pivot said powered means to its rearmost pivotal position.

6. The powered hand truck of claim 1 wherein the lateral projection of said runners is a line tangent to said wheels to provide a smooth transition as the weight of said hand truck is transferred from said runners to said wheels and said runners include endless belt glide belts passing along a guide surface of said runners and looping about said runners and the axis of each wheel and conforming substantially to the guide surface of said runners, and of a material having a low coefficient of friction in association with said guide surface of said runners, whereby damage to the edges of the steps is minimized and whereby frictional forces opposing the stair-climbing motion are minimized.

7. The powered hand truck of claim 1 further comprising a guard, extensible below the wheels and retractable with said ram and pivotable with said powered means, disposed to the rear of said powered means and frontward of said runners, whereby when the hand truck rolls onto a step the guard shields said ram from contacting the edge of the step and limits the rearward roll of the hand truck onto the step until the ram is retracted.

8. The powered hand truck of claim 1 further comprising mechanical pivotal shifting means connected between said powered means and said frame, and having a portion thereof in the path of the retracting ram said shifting means being directly and solely mechanically responsive to pressure exerted on said portion by said ram during its retracting motion for pivoting said powered means to its rearmost pivotal position.

9. The powered hand truck of claim 1 further comprising means for yieldably detenting said ram in its extreme retracted position, whereby said ram can be extended from its extreme retracted position only by a force exceeding a predetermined limit, said ram being thereafter controllably extensible over a wide continuous range of extensions.

10. The powered hand truck of claim 1 further comprising means for resiliently and yieldably detenting said powered means at predetermined front and back limits of its pivotal swinging motion, at which front and back limits the longitudinal axis of said ram is directed respectively slightly forward and slight backward of said common axis of said wheels whereby said powered means can be moved from the limit pivotal positions only by forces exceeding predetermined limits.

11. For attachment to a hand truck having a frame extending in a longitudinal direction from a lower end to an upper end and extending laterally from a left side to a right side, having a front side for retaining a load and a back side, having a pair of runners extending in the longitudinal direction along the lower portion of the back of the frame and having a pair of wheels attached for rotation about a common lateral axis to the lower end of the frame, a stair-climbing power unit comprising:

powered means pivotally connected to said frame for limited rotational swinging movement about a lateral axis, said powered means having a powered ram and being selectively operable to extend said ram in a generally longitudinal direction below said wheels, and to maintain said ram held at an attained extension, and to retract said ram;

manually actuable means for operating said powered means to extend said ram for elevating the hand truck to an upper stair step; and neutralizing means connected between said frame and said powered means and responsive during extension of said ram in ascending the stair step to predetermined pivotal rotation of said powered means about said lateral axis toward said front side of said frame as the elevated hand truck begins to roll onto the stair step for automatically operating said powered means to terminate further extension of said ram and maintain the then attained extension of said ram.

12. The power unit of claim 11 wherein said powered unit further comprises:

a pneumatic cylinder having two inlet ports for applying pneumatic forces to said ram in both directions parallel to the axis of said cylinder, for selectively extending and retracting said ram and for maintaining it at an attained extension or retraction;

a bi-directional pneumatic control valve, comprising two outlet ports, each connected to one of said inlet ports of said pneumatic cylinder and an inlet port, said valve normally yieldably remaining in a neutral configuration wherein said inlet port is not connected to either of said outlet ports, and solely mechanically actuatable to configurations wherein said inlet port is selectively connected to one of the outlet ports said ram maintaining an existing extension while said control valve is in its neutral configuration and until the valve is mechanically actuated to one of the other configurations by positive action of an operator; and a source of pneumatic pressure, connected to said inlet port of said pneumatic control valve.

13. The power unit of claim 12 wherein said neutralizing means further comprises:

mechanical linkage means connected to said frame and said powered means, responsive during extension of said ram in ascension of a step to the predetermined pivotal rotation of said powered means toward the front of said frame for blocking mechanical actuation of said pneumatic control valve to a configuration wherein the inlet port of said control valve is interconnected to a predetermined one of its output ports associated with extension of said ram.

14. The power unit of claim 13 wherein said mechanical linkage provides a variable length fore and aft connection between said frame and said powered means and has a portion thereof in the path of the ram when it retracts, said linkage being solely mechanically responsive to pressure exerted thereon by said ram during its retracting motion for changing its length to pivot said powered means to its rearmost pivotal position.

15. The stair-climbing attachment of claim 11 further comprising a guard, extensible below the wheels and retractable with said ram and pivotable with said powered means, disposed to the rear of said powered means and frontward of said runners, whereby when the hand truck rolls onto a step the guard shields said ram from contacting the edge of the step and limits the rearward roll of the hand truck onto the step until said ram is retracted.

16. The stair-climbing attachment of claim 11 further comprising mechanical shifting means connected to said powered means and to said frame, and having a portion thereof in the path of the ram when it retracts, said shifting means being directly and solely mechanically responsive to pressure exerted on said portion by said ram during its retracting motion for drawing said powered means to its rearmost pivotal position.

17. The stair-climbing attachment of claim 11 further comprising means for yieldably detenting said ram in its extreme retracted position whereby said ram can be extended from its extreme retracted position only by a force exceeding a predetermined limit, said ram being thereafter controllably extensible over a wide continuous range of extensions.

18. The stair-climbing attachment of claim 11 further comprising means for resiliently and yieldably detenting said powered means at predetermined front and back limits of its pivotal swinging motion at which front and back limits the longitudinal axis of said ram is directed respectively slightly forward and slightly backward of said common axis of said wheels, whereby said powered means can be moved from the limit pivotal positions only by forces exceeding predetermined limits.

19. In a powered hand truck adapted for climbing stair steps, having a frame extending in a longitudinal direction from a lower end to an upper end and extending laterally from a left side to a right side, having a front side for retaining a load and a back side, having a pair of runners extending in the longitudinal direction along the lower portion of the back of the frame, having a pair of wheels attached for rotation about a common lateral axis to the lower end of the frame, and having powered means pivotally connected to the frame for limited rotational swinging movement about a lateral axis and having a powered ram controllably extensible in a generally longitudinal direction below the wheels and controllably retractable, the improvement comprising:

neutralizing means connected between said frame and said powered means and responsive during extension of said ram in ascending a stair step to predetermined pivotal rotation of said powered means toward the front side of said frame as the hand truck begins to roll onto the stair step for automatically operating said powered means to terminate further extension of said ram and maintain the then attained extension of said ram.

20. The improvement of claim 19 further comprising:

mechanical linkage means connected to said frame and said powered means, responsive, during extension of the ram in ascension of a stair step, to the predetermined pivotal rotation of said powered means toward the front of said frame for automatically operating said powered means to terminate further extension of said ram and maintain the then-attained extension of said ram.

21. The improvement of claim 20 wherein said mechanical linkage is connected between said frame and said powered means to provide a variable length linkage therebetween, said mechanical linkage having a portion thereof in the path of the retracting ram, said linkage being responsive to pressure exerted on said portion by said ram during its retracting motion for changing its length to pivot said powered means to its rearmost pivotal position.

22. In a powered hand truck having a frame extending in a longitudinal direction from a lower end to an upper end and extending laterally from a left side to a right side and having a front side for retaining a load and a back side, having a pair of runners extending in the longitudinal direction along the lower portion of the back of the frame having a pair of wheels attached for rotation about a common lateral axis to the lower end of the frame, having powered means pivotally connected to the frame for limited movement about a lateral axis and having a ram controllably extensible in a generally longitudinal direction below the wheels and controllably retractable, the improvement comprising:

a guard, extensible below the wheels and retractable with the ram, and pivotable with the powered means, disposed to the rear of the powered means and frontward of said runners, whereby when the hand truck rolls onto a step the guard shields the ram from contacting the edge of the step and limits the rearward roll of the hand truck onto the step until the ram is retracted.

23. In a powered hand truck having a frame extending in a longitudinal direction from a lower end to an upper end and extending laterally from a left side to a right side and having a front side for retaining a load and a back side, having a pair of runners extending in the longitudinal direction along the lower portion of the back of the frame, having a pair of wheels attached for rotation about a common lateral axis at the lower end of the frame, having powered means pivotally connected to the frame for limited movement about a lateral axis and having a ram controllably extensible in a generally longitudinal direction below the wheels and controllably retractable, the improvement comprising:

mechanical shifting means connected to said powered means and said frame and having a portion thereof in the path of the ram when it retracts and directly and solely mechanically responsive to pressure exerted on said portion by said ram during its retracting motion for pivoting said powered means to its rearmost pivotal position.

24. In a powered hand truck having a frame extending in a longitudinal direction from a lower end to an upper end and extending laterally from a left side to a right side and having a front side for retaining a load and a back side, having a pair of runners extending in the longitudinal direction along the lower portion of the back of the frame, having a pair of wheels attached for rotation about a common lateral axis to the lower end of the frame, having powered means pivotally connected to the frame for limited movement about a lateral axis and having a ram controllably extensible in a generally longitudinal direction below the wheels and controllably retractable, the improvement comprising:

a ram detent for yieldably holding the ram in its extreme retracted position whereby the ram can be extended from its extreme retracted position only by application of force exceeding a predetermined limit, said ram being thereafter controllably extensible over a wide continuous range of extensions.

25. In a powered hand truck having a frame extending in a longitudinal direction from a lower end to an upper end and extending laterally from a left side to a right side and having a front side for retaining a load and a back side, having a pair of runners extending in the longitudinal direction along the lower portion of the back of the frame, having a pair of wheels attached for rotation about a common lateral axis to the lower end of the frame, having powered means pivotally connected to the frame for limited movement about a lateral axis and having a ram controllably extensible in a generally longitudinal direction below the wheels and controllably retractable, the improvement comprising:

powered means detents for resiliently and yieldably holding the powered means at predetermined front and back limits of its pivotal swinging motion at which front and back limits the longitudinal axis of said ram is directed respectively slightly forward and slightly back of the common axis of said wheels whereby it can be moved from the limit pivotal positions only by application of forces exceeding predetermined limits.

26. In a powered hand truck having a frame extending in a longitudinal direction from a lower end to an upper end and extending laterally from a left side to a right side and having a front side for retaining a load and a back side, having a pair of runners extending in the longitudinal direction along the lower portion of the back of the frame having a pair of wheels attached for rotation about a common lateral axis to the lower end of the frame, said wheels including selectively engageable ratchets, having powered means pivotally connected to the frame for limited movement about a lateral axis and having a ram controllably extensible in response to actuation of an extension trigger by the operator in a generally longitudinal direction below the wheels and controllably retractable, and having neutralizing means connected between the frame and the powered means and responsive to predetermined motion of said powered means relative to said frame for automatically operating said powered means to terminate further extension of said ram and maintain the then attained extension of said ram, the improvement comprising:

a tripping mechanism interconnected between the extension trigger and the ratchets of the wheels for engaging the wheel ratchets when the extension trigger is actuated.

27. The improvement of claim 26 further including a tripping mechanism reset, whereby the wheel ratchets can be released only by positive resetting action of the operator once they have been engaged.

28. In a powered hand truck having a frame extending in a longitudinal direction from a lower end to an upper end and extending laterally from a left side to a right side and having a front side for retaining a load and a back side, having a pair of runners extending in the longitudinal direction along the lower portion of the back of the frame, having a pair of wheels attached for rotation about a common lateral axis to the lower end of the frame, said wheels including selectively engageable ratchets, having powered means pivotally connected to the frame for limited movement about a lateral axis and having a ram controllably extensible in response to actuation of an extension trigger by the operator in a generally longitudinal direction below the wheels and controllably retractable, the improvement comprising:

a tripping mechanism interconnected between the extension trigger and the ratchets of the wheels for engaging the wheel ratchets when the extension trigger is actuated.

* * * * *